March 25, 1924. 1,488,223
P. D. THIBERT
LOCK NUT
Filed May 23, 1923
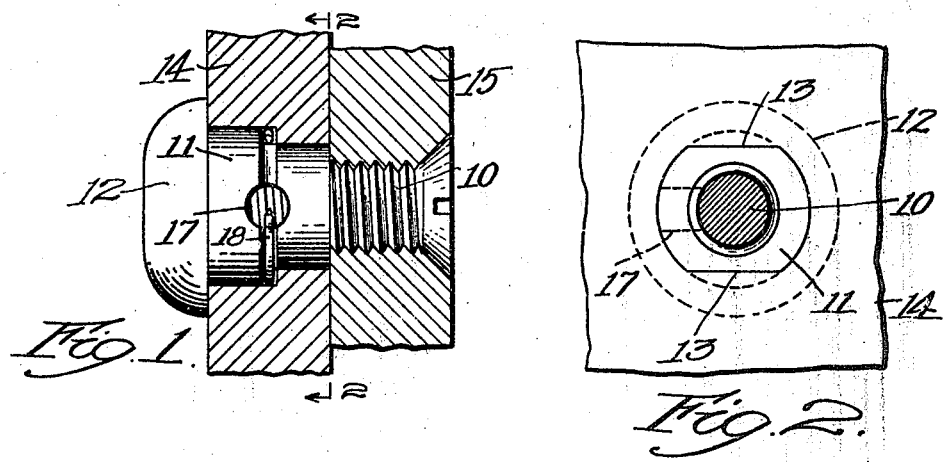
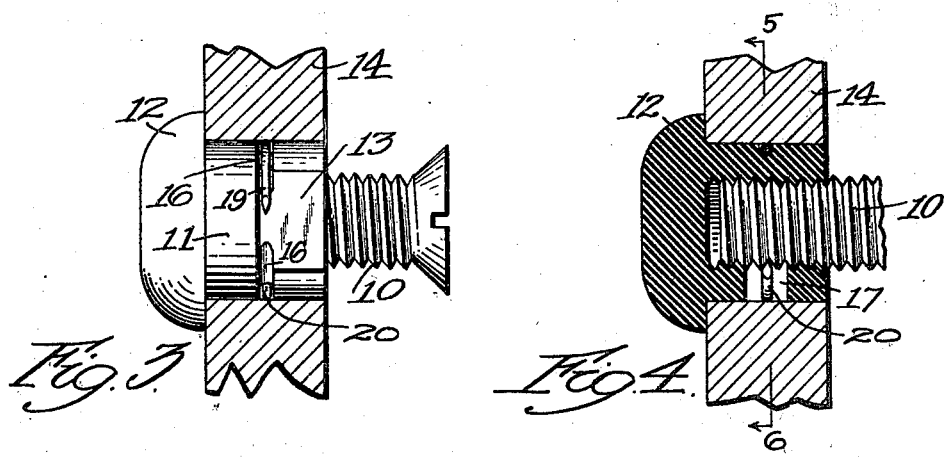
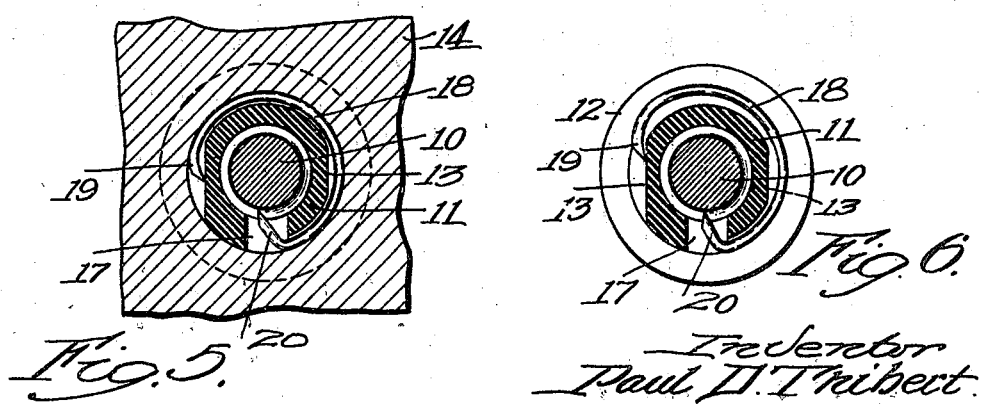
Inventor
Paul D. Thibert
By attorneys
Southgate & Southgate
Witness
C. F. Wesson Patented Mar. 25, 1924.

1,488,223

UNITED STATES PATENT OFFICE.

PAUL D. THIBERT, OF SPRINGFIELD, MASSACHUSETTS.

LOCK NUT.

Application filed May 23, 1923. Serial No. 640,984.

*To all whom it may concern:*

Be it known that I, PAUL D. THIBERT, a citizen of the United States, residing at Springfield, in the county of Hampden and State of Massachusetts, have invented a new and useful Lock Nut, of which the following is a specification.

This invention relates to a self locking nut for use in certain places in which it is desired to have the end of the nut smooth, without projections or sharp edges. This type of nut ordinarily comprises a nut proper which is cylindrical and has a circular head presenting smooth exterior curved surfaces at all points and has a cylindrical neck back of the head in which the nut is adapted to be positively fixed and provided with flat sides for the purpose of preventing it from turning. Nuts of this kind are used in various places, as for example, fastening car seats to their frames.

The principal object of this invention is to provide a self-locking device for this type of nut which will prevent the inscrewing of the nuts which is so common on account of the vibration to which they are subjected. The number of nuts lost from this source and the amount of time required to replace them involves heavy expense for the railroads. This invention is designed to obviate the same.

Other objects and advantages of the invention will appear hereinafter.

Reference is to be had to the accompanying drawings, in which—

Fig. 1 is a section of two parts to be held together showing in side view a nut and bolt constructed in accordance with this invention;

Fig. 2 is a sectional view of the bolt on the line 2—2 of Fig. 1, showing the nut in end elevation;

Fig. 3 is a view like Fig. 1 taken at right angles thereto;

Fig. 4 is a central longitudinal sectional view of the nut shown on the bolt;

Fig. 5 is a section of the whole device on the line 5—6 of Fig. 4 with the parts in operative position;

Fig. 6 is a sectional view of the bolt and nut removed from the supporting plate, taken on the plane of the line 5—6 of Fig. 4.

The bolt or screw 10 which is ordinarily used for certain purposes, as above indicated, screws into the nut 11, but unlike ordinary nuts this is closed at the end and is provided with a smooth head 12 preferably having curved surfaces that will not catch on the clothing of the passengers or make the appearance of the device unsightly. The external walls of this nut under the head are cylindrical but it has two flat sides 13.

This nut is intended to be mounted in a supporting plate 14 having a cylindrical bore all the way through it and provided with flat external sides to engage the flat sides 13 to prevent its turning. This constitutes a unitary structure so that these two parts cooperate always as one, unless they are released from each other, and it avoids the projection of the bolt through the nut at the end. The parts so far described in detail are all old and well known in this art. The trouble with them is that the bolt which holds the plate 14 to another part as 15 gets loose under continued vibration.

The present improvement consists in providing the nut 11 with a circumferential groove 16 all the way around it just at the ends of the flat surfaces 13 and providing a radial perforation 17 through the wall of the nut into the interior. In this groove I place a spring 18 of wire. In its normal position on the nut, if removed from the bore in the plate so as not to be constrained in any way, its rear end at 19 is pointed off to project in toward the middle and from that point around it projects out beyond the groove and then gradually hugs into the groove. It has an end 20 bent nearly at right angles or substantially radially, but at a little angle to a true radial line, and its end is sharpened off so that it will engage in the screw thread of the bolt. This serves as a pawl and ratchet although there are no ratchet teeth.

When the bolt is screwed in, the end 20 yields to allow that to occur but when it is attempted to withdraw the bolt the sharpened end 20 catches the teeth and tends to resist them. Without being in the bore this resistance would not be very important but it is to be noted that when the nut is placed in the bore the wire spring has to be compressed a little to get it into it, especially at the part located at the top in Fig. 4. This puts the spring under compression and forces the end 20 always to be resiliently held toward the threads of the bolt so when the parts are fully assembled this constitutes an effective lock nut although it is not an absolutely positive one. In this class of nuts an absolutely positive lock nut would not do because it could not be taken off at all in case of necessity. In this case the nut can be removed by exerting extra heavy pressure on the wrench and possibly injuring the screw. Ordinarily, however, after it is once set up it need not be taken apart again.

The essential feature is the fact that the spring is always held by the internal surface of the bore in a position to have its end engage the screw thread and is forced toward the screw thread so that there is always a pressure on the spring to force it into its operative position. The rear end of the spring also rests on one of the flat surfaces 13 and is bent into shape to permit it to do so, thus avoiding any danger of the spring creeping around the nut. This would not be accomplished effectively by the perforation 17 because after the spring had crept around to the edge of it, it would not function properly to hold the bolt.

Although I have illustrated and described only a single form of the invention, I am aware of the fact that modifications can be made therein by any person skilled in the art without departing from the scope of the invention as expressed in the claims. Therefore I do not wish to be limited to all the details of construction herein shown and described but what I do claim is:

1. As an article of manufacture, a nut having a closed end to prevent the projection of its bolt through the end of the nut and provided with a circular external surface under said head, a locking spring located on said circular surface between the ends of the nut and projecting through the wall of the nut into contact with the thread of the bolt and means for preventing the nut from turning.

2. The combination with a nut provided with a groove around its surface located between its ends and a perforation through the wall of the nut of a locking spring resting in said groove, the end of which projects through the perforation for engagement with the bolt, and means outside the nut for holding the locking spring in operative position.

3. In a bolt locking device, the combination with a nut having a closed end to prevent the projection of the bolt through the end of the nut, of a locking spring located on the side surface of said nut and projecting in through the wall of the nut into contact with the thread of the bolt, and means surrounding the circular surface of the nut for positively engaging said spring and forcing its ends against the nut and keeping the spring under compression.

4. In a bolt locking device, the combination with a nut for the bolt, said nut having a groove entirely around it between its ends and a perforation through from said groove to the interior, of a substantially circular wire spring lying in said groove and having one end bent sharply and extending in through said perforation and provided with a sharp point on the end for engaging the thread of the bolt, said end being nearly radial but extending from the radial position in a direction to permit the bolt to be turned up, whereby when it is turned back or unscrewed the point on the end of the wire will resist it, said nut having a pair of opposite flat surfaces extending from the open end of the nut to the groove, and a support for the nut having a passage therethrough fitting on the circular and flat surfaces of said nut to hold it in position, the inner circular surface of said support being adapted to engage the outside of the spring to keep it under compression and hold its point against the bolt.

5. In a bolt locking device, the combination with a nut for the bolt having a cylindrical surface into the center of which the threaded opening for the bolt passes and provided with a continuous head on one end to prevent the projection of the bolt into a position where it can be seen, said cylindrical surface of the nut having a groove entirely around it about midway between its ends and a perforation through from said groove to the interior, of a substantially circular wire spring lying in said groove and having one end bent sharply and extending in through said perforation and provided with a sharp point on the end for engaging the thread of the bolt, said end being nearly radial but extending from the radial position in a direction to permit the bolt to be turned up, whereby when it tends to turn back or unscrew the point of the nut having a pair of opposite flat surfaces extending from the open end of the nut to the groove, and a support having a cylindrical passage therethrough fitting on said cylindrical surface of the nut, and a pair of opposite flat surfaces fitting against said flat surfaces to hold the two parts in position, the inner cylindrical surface of said support being adapted to engage the outside of the spring to keep it under compression and hold its point yieldingly against the bolt, the opposite end of said spring being flattened and engaging one of the other surfaces on the nut.

In testimony whereof I have hereunto affixed my signature.

PAUL D. THIBERT.